455/3

March 25, 1969 W. A. RHEINFELDER 3,435,358

CABLE TELEVISION AMPLIFIER POWERING

Filed June 8, 1966

OR 330/297, 200

INVENTOR.
WILLIAM A. RHEINFELDER
By White & Haefliger
ATTORNEYS.

United States Patent Office 3,435,358

Patented Mar. 25, 1969

3,435,358

CABLE TELEVISION AMPLIFIER POWERING

William A. Rheinfelder, South Laguna, Calif., assignor to Anaconda Electronics Company, Anaheim, Calif., a corporation of Delaware Filed June 8, 1966, Ser. No. 556,162

Int. Cl. H03f 3/04, 3/68

U.S. Cl. 330—22 9 Claims

ABSTRACT OF THE DISCLOSURE

A system for energizing repeater amplifiers spaced at remote locations along a television signal distribution cable. AC power is transmitted together with the signal over the cable, and at each remote location a portion of the AC power is converted to DC by a bridge rectifier to provide a floating power supply for a corresponding amplifier.

This invention relates generally to cable television, and more specifically concerns powering of cable television amplifiers.

In multi-channel cable television system, TV signals are repeatedly amplified in cascaded amplifiers so as to compensate for the normal distribution losses in signal strength. In solid-state cable television systems, power for the amplifiers is supplied simultaneously with the RF-signals through the coaxial cable or transmission line. Historically, first attempts at such powering utilized DC current transmission in the cable; however, this results in heavy corrosion of connectors, cable and equipment and is therefore not satisfactory. An alternate method consists of AC powering by using transformer type AC supplies. However, the power supply circuits inside the amplifiers were such as to result in the supply of excessive DC current, with consequent corrosion problems. Another difficulty encountered in the power supplies relates to the voltage drop and resistance in the cable which in turn effects rectifier efficiency and reducing the usable distance between power supply and amplifier.

The present invention has for its major object the elimination of the above-mentioned problems, and concerns an amplifier powering system which is characterized as eliminating direct current flow in the cable in order to eliminate corrosion; in addition, the new system makes rectification efficiency independent of cable resistance.

Basically, the invention concerns the provision in combination with the cable, transistorized amplifiers and AC powering means of an inverter, as for example a diode bridge, electrically connected between the cable inner conductor and the transistors to supply DC current of one polarity to the collector electrodes and DC current of opposite polarity to other electrodes of the transistors, the inverter also having a common terminal connected with the cable outer conductor and with the amplifier R.F. common terminal. Such a system is characterized by floating of both plus and minus voltages within the amplifier chassis above the housing ground which is directly connected to the transmission cable outer conductor and must be grounded at all times. Also, the R.F. circuits are grounded directly to the housing, and the bridge rectifiers are individually by-passed with R.F. capacitors for the reduction of distortion. Since the DC current is shunted in the shortest possible way by a second diode in the bridge, cable resistance only lowers the AC input voltage, and does not affect rectifier efficiency. As a result, higher allowable DC resistance results in much superior amplifier powering in cable television systems; thus, it becomes possible to operate cable television amplifiers from a much smaller AC input voltage and over greater distances. Due to the higher rectifier efficiency, current drain is effectively reduced by completing the DC circuit within the amplifier; whereby DC components are eliminated from the cable system and corrosion is thereby eliminated.

These and other objects and advantages of the invention, as well as the details of illustrative embodiments, will be more fully understood from the following detailed description of the drawings, in which.

Figures 1, 2, 3:
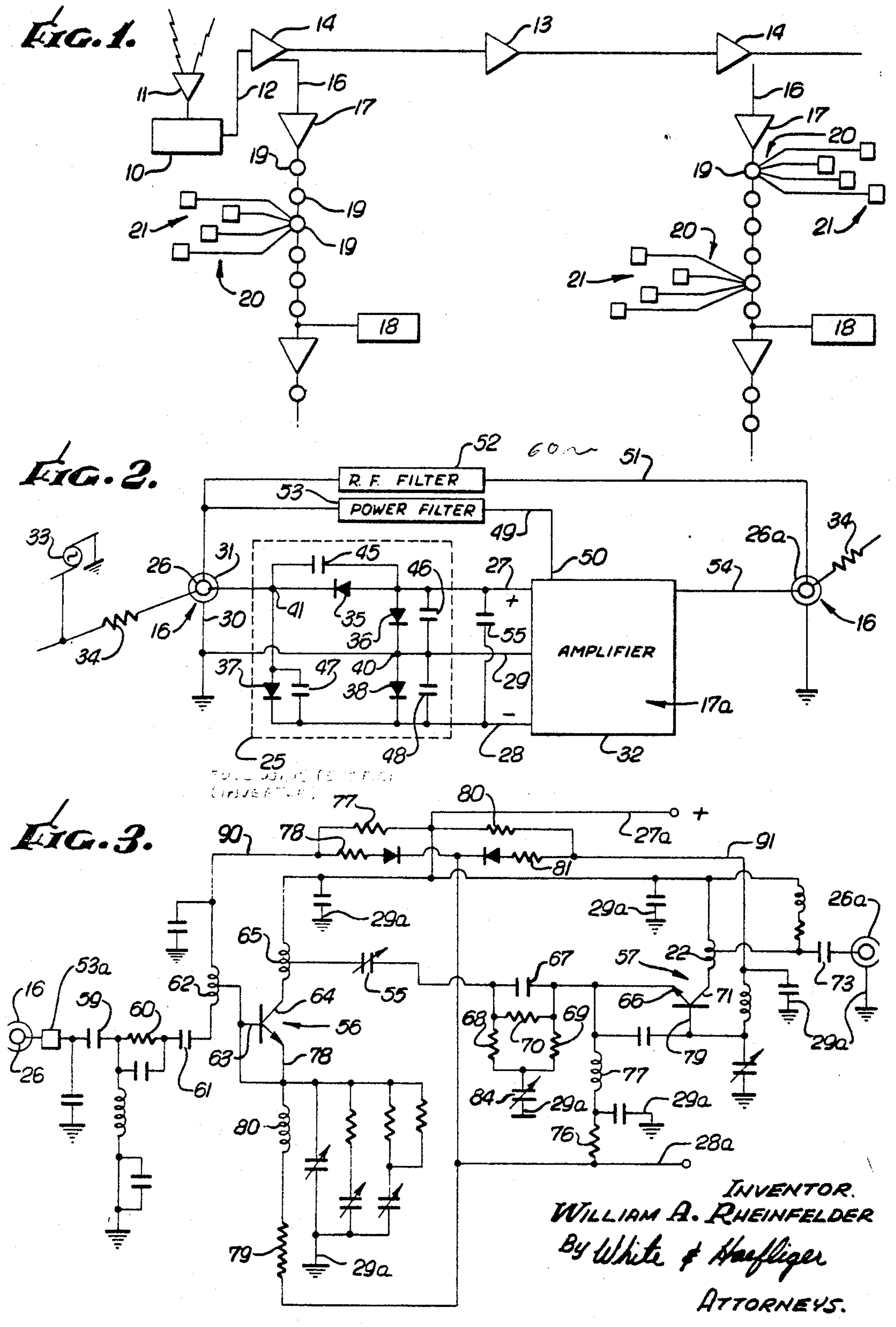
FIG. 1 is a generalized block diagram showing a portion of a cable television system.
FIG. 2 is a circuit diagram showing one form of inverter of the invention.
FIG. 3 is a typical circuit diagram of an amplifier to be powered by the inverter.

Referring first to FIG. 1, the illustrated cable television system includes head end equipment 10 with antenna 11 to pick up broadcast multi-channel television signals. Such equipment is known and is operable to correct and adjust the signal level for each channel, with separate correction for picture and sound carriers. Such equipment also typically includes preamplifiers, demodulators, modulators for each channel, together with a multi-channel combining network, the output of which is applied to the cable system.

To the right of the equipment 10 is shown a main trunk line which is the major link from the head end 10 to the community. It consists of coaxial cable 12 with repeater or main trunk amplifiers 13 connected in series with and spaced along the cable. AGC amplifiers may also be connected in series with the cable to provide automatic correction for changes in signal level. The main trunk line also includes bridging amplifiers 14, each having several outputs and enough gain to make up for isolation loss and power loss inherent in multiple outputs. From the bridging amplifiers feeder lines 15 are run along a row of subscribers' houses. The feeder lines include coaxial cable 16 and line extender amplifiers 17 operable to compensate for the loss in the feeder system. As an example, each feeder line may include four to ten or more line extender amplifiers. Power to the cables is supplied at permissible levels as by the transformers or other sources 18. Between successive amplifiers 17, directional taps or couplers 19 are provided, typically with multiple outputs 20 to which individual home receivers 21 are connected, such taps being known devices. For example, a four house tap is typically used every 150 feet.

In FIG. 2, an inverter in the form of a full wave rectifier diode bridge 25 is electrically connected between the center conductor 26 of cable 16 and the transistors of amplifier 17*a* to supply DC current of one polarity at 27 to the collector electrodes and DC current of opposite polarity at 28 to other electrodes of the amplifier transistors. The inverter also has a common terminal 29 connected at 30 with the cable outer conductor 31 and with the amplifier R.F. common terminal or housing 32. AC power, as for example, 60 cycle power for the cable center conductor is indicated at 33, and conductor resistance is indicated at 34.

The diode bridge includes first, second, third and fourth diodes 35–38, each having primary and secondary terminals. The primary terminals of first an second diodes 35 and 36 are connected to the collector electrodes via connection 27; the secondary terminals of the third and fourth diodes 37 and 38 are connected to the transistor other electrodes via connection 28; the secondary terminal of the second diode 36 and the primary terminal of the fourth diode 38 are connected at 40 to the common terminal 29; and the secondary terminal of the first diode 35 and the primary terminal of the third diode 37 are connected at 41 to the cable center conductor 26. Typically, the primary and secondary terminals are the anodes and cathode terminals respectively of the diodes, positive voltage is supplied at 27 to the transistor collectors, and negative voltage is supplied at 28 to amplifier transistor emitter and base electrodes.

FIG. 2 shows R.F. passing individual capacitors 45–48 connected across individual diodes 35–38 in the bridge, to reduce amplifier distortion. FIG. 2 also illustrates a lead 49 supplying R.F. to the amplifier input 50, and a power lead 51 by-passing the amplifier and inverter, as by connecting the center conductors 26 and **26*a* of the cable lengths at input and output sides of the amplifier. An R.F. filter 52 and a power filter 53 are respectively connected in series with the leads 51 and 49. The amplifier output appears at 54 and is connected to center conductor 26*a*. An electrolytic capacitor 55 connected between amplifier input connections 27 and 28 filters the input voltages. Note that the latter float within the amplifier and above the housing ground 29 to which the amplifier R.F. circuits are grounded. Such floating is facilitated by the bridge 25. Thus, unidirectional current flows from the cable conductor 26 through diode 37 on one half cycle of AC power, completing the circuit through the transistors and back through diode 36 to R.F. and cable ground connector 29. During the other half cycle, current flow from ground connector 29 through diode 38, then through the transistors and back through diode 35 to the cable conductor 26. The value of the DC voltage across the connections 27 and 28 is almost equal to the AC voltage applied via the cable across the connections 40 and 41**.

FIG. 3 illustrates one form of amplifier, as seen at 17 in FIG. 1, to be powered in accordance with the invention. Positive and negative voltage supply points are seen at **27*a* and 28*a*, corresponding to points 27 and 28 in FIG. 2. The amplifier has interconnected amplification stages as represented by transistors 56 and 57. The input path to base electrode 63 of transistor 56 includes the center conductor 26 of coaxial cable 16, and coupling capacitor, resistor and choke elements 59–62. Variable capacitor 55 is connected in series with the output path from collector electrode 64 of transistor 56, that path including choke 65**.

Variable capacior 84 is connected in shunt with the input path to emitter electrode 66 of second stage transistor 57, that path including coupling capacitor 67. The shunt circuit in which variable capacitor 84 is incorporated includes resistances 68–70 connected in the network shown. The output path from collector electrode 71 of transistor 57 includes choke 72 and coupling capacitor 73, to which the center conductor **26*a*** of the next run of cable is connected.

Bias for base electrode 63 is provided by dropping collector voltage at **27*a* through divider resistances 77 and 78 for application via lead 90; likewise, bias for base electrode 79 of transistor 57 is provided by dropping voltage at 27*a* through divider resistances 80 and 81 for application via lead 91. Negative voltage connection 28*a* has connection with emitter 66 via resistor 76 and choke 77, and with emitter electrode 78 of transistor 56 via resistor 79 and choke 80**. The amplifier is also described in my copending application entitled, "Cable Television Amplifier Gain and Tilt Control," Ser. No. 556,160, filed June 8, 1966.

Points **29*a* indicate grounding to the housing and to the cable outer conductor 31, as via the connection 29** in FIG. 2.

The present invention eliminates a problem found in half wave rectifier circuits. In the latter, the forward resistance of the diodes is increased undesirably due to the effect of the cable resistance, with consequent reduction in amplifier supply voltage. As a result, amplifier spacing is undesirably reduced, with consequent need for more amplifiers. In the present invention the maximum cable resistance that can be used between amplifiers is increased more than 100%, say from 50 ohms to 125 ohms, so that a longer run of cable between amplifiers is possible, permitting more amplifiers to be powered from one external power supply 18. The present invention also eliminates need for transformers for power transmission between the cable and amplifiers, transformers being undesirable due to their size and weight. The use of the inverter as described herein eliminates need for DC current flow in CATV cable, and its efficiency in operation is independent of cable resistance.

I claim:

1. In a cable television system, a coaxial cable to transmit multiple channel television signals, multiple wideband R.F. solid state amplifiers electrically connected in series with the cable, said amplifiers including transistors having collector electrodes and other electrodes, means to supply AC power for transmission by a cable conductor having resistance, and a diode bridge inverter electrically connected between said cable and the transistor electrodes to supply DC current thereto.

2. In a cable television system, a coaxial cable to transmit multiple channel television signals, multiple wideband R.F. solid state amplifiers electrically connected in series with the cable, said amplifiers including transistors having collector electrodes and other electrodes, means to supply AC power for transmission by the cable inner conductor having resistance, and an inverter electrically connected between the cable and the transistors to supply DC current of one polarity to the collector electrodes and DC current of opposite polarity to said other electrodes, the inverter also having a common terminal connected with the cable outer conductor and with the amplifier R.F. common terminal.

3. The system of claim 2, in which the inverter comprises a full wave diode rectifier bridge.

4. The system of claim 3, in which the diode bridge includes first, second, third and fourth diodes each having primary and secondary terminals, the primary terminals of the first and second diodes connected to the collector electrodes, the secondary terminals of the third and fourth diodes connected to said other electrodes, the secondary terminal of the second diode and the primary terminal of the fourth diode connected to said common terminal, and the secondary terminal of the first diode and the primary terminal of the third diode connected to the cable center conductor.

5. The system of claim 4, in which said primary and secondary terminals are the anode and cathode terminals respectively of the diodes.

6. The system of claim 3, in which the inverter includes a diode connected between the inverter common terminal and said other electrodes of the transistors.

7. The system of claim 3, including R.F. passing capacitors connected across individual diodes in the bridge.

8. For use in a cable television system having a coaxial cable to transmit multiple channel television signals, multiple wide-band R.F. solid state amplifiers electrically connected in series with the cable, the amplifiers including transistors having collector electrodes and other electrodes, and means to supply AC power for transmission by the cable inner conductor having resistance, the improvement comprising an inverter in the form of a diode bridge electrically connected between the cable and the transistors to supply DC current of one polarity to the collector electrodes and DC current of opposite polarity to said other electrodes, the inverter also having a common terminal connected with the cable outer conductor and with the amplifier R.F. common terminal.

9. The combination of claim 8, in which the diode bridge includes first, second, third and fourth diodes each having primary and secondary terminals, the primary terminals of the first and second diodes connected to the collector electrodes, the secondary terminals of the third and fourth diodes connected to said other electrodes, the secondary terminal of the second diode and the primary terminal of the fourth diode connected to said common terminal, and the secondary terminal of the first diode and the primary terminal of the third diode connected to the cable center conductor.

References Cited

UNITED STATES PATENTS 3,064,195 11/1962 Freen ............. 330—24 X
3,233,184 2/1966 Wheatley .......... 330—22 X ROY LAKE, *Primary Examiner.*

S. H. GRIMM, *Assistant Examiner.*

U.S. Cl. X.R.

330—40, 200; 307—296; 178—70; 179—170; 321—46; 340—310; 325—308